Patented Mar. 10, 1925.

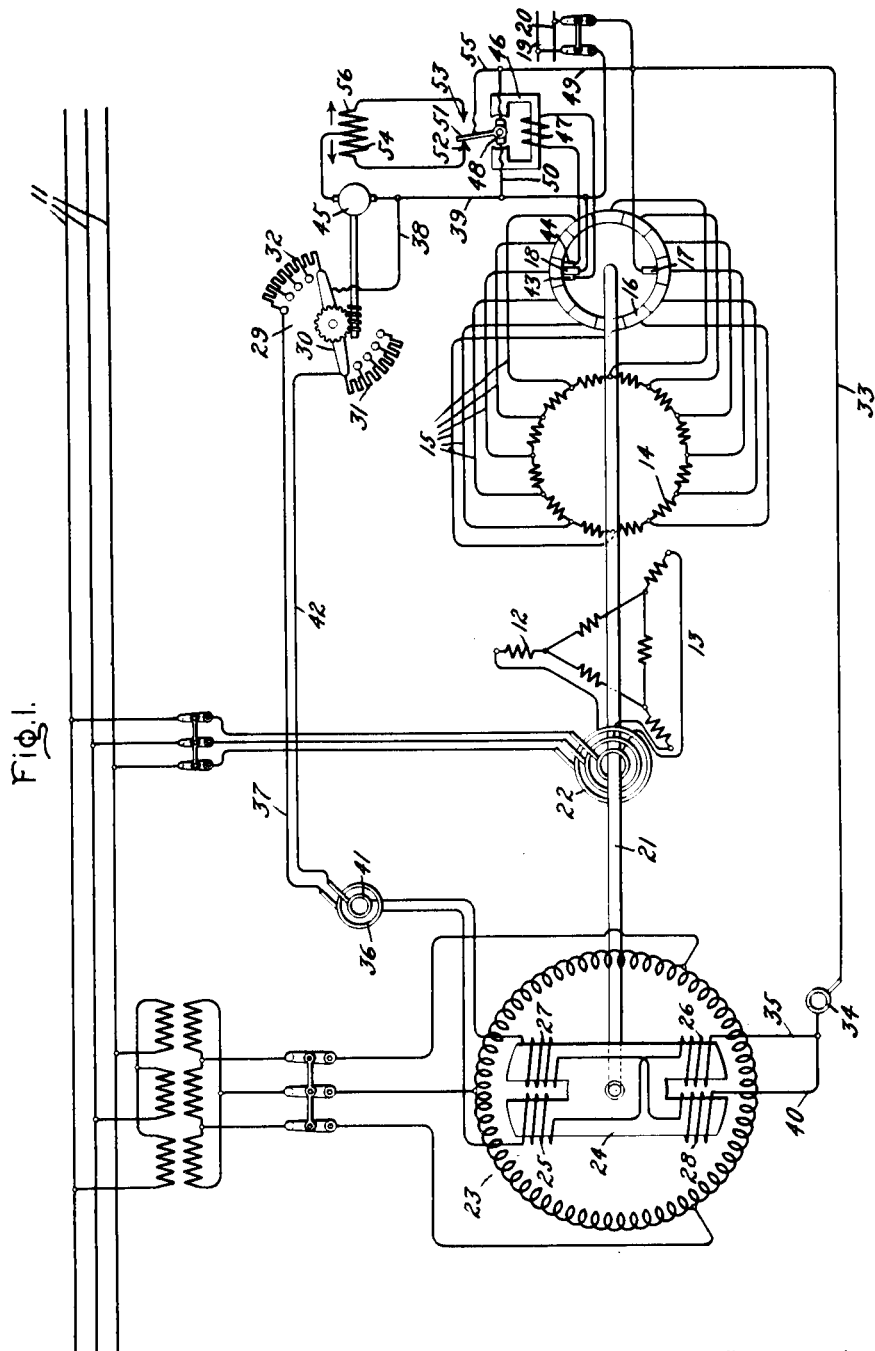

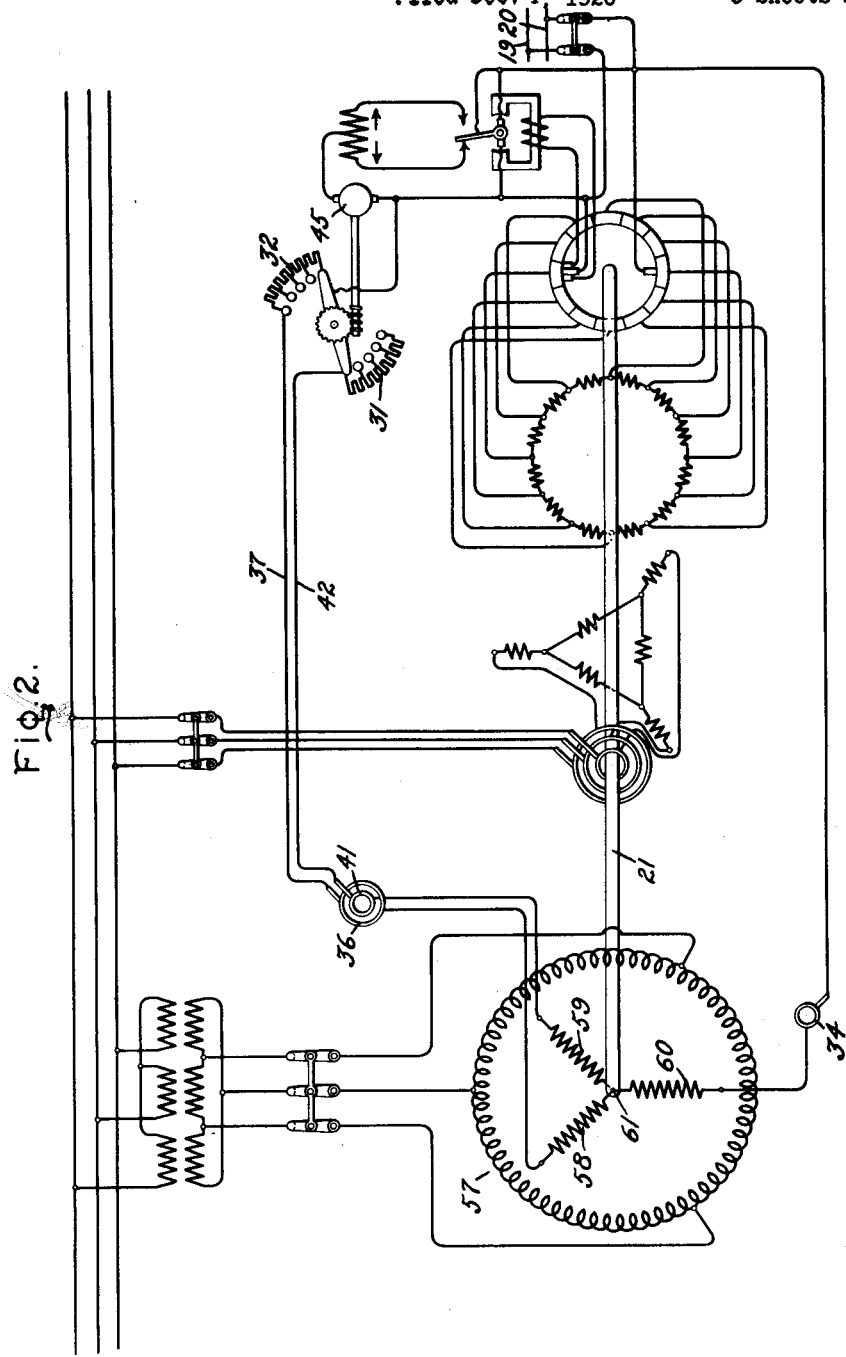

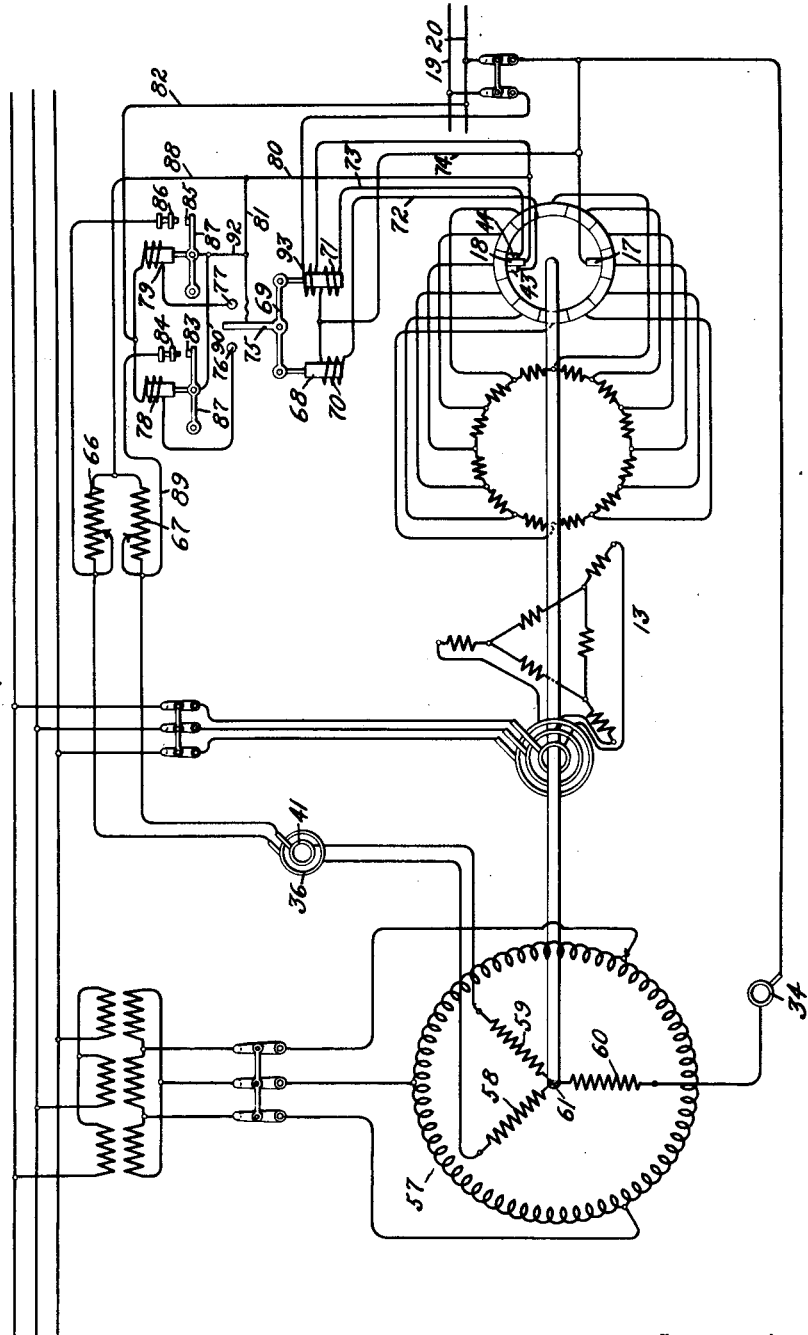

1,529,341

UNITED STATES PATENT OFFICE.

JOSEPH L. BURNHAM, OF SCHENECTADY, NEW YORK, ASSIGNOR TO GENERAL ELECTRIC COMPANY, A CORPORATION OF NEW YORK.

MECHANICAL RECTIFIER.

Application filed December 1, 1920. Serial No. 427,550.

*To all whom it may concern:*

Be it known that I, JOSEPH L. BURNHAM, a citizen of the United States, residing at Schenectady, in the county of Schenectady, State of New York, have invented certain new and useful Improvements in Mechanical Rectifiers, of which the following is a specification.

This invention relates to mechanical rectifiers and more particularly to the type in which are employed a commutator and relatively rotatable brushes.

The greatest drawback to mechanical rectification where a considerable amount of power is rectified has been the poor commutation usually obtained with this type of apparatus. The sparking at the brushes may be the result of several conditions in the circuit. For example, if there be only a small number of segments in the commutator, the voltage per segment would be high, as well as the reactance voltage of commutation. This bad condition of course may be readily remedied by providing a much greater number of segments. Other conditions, however, are not so susceptible to improvement. Thus upon an increase in load there is a corresponding increase in the amount of sparking. Likewise, if the power supplied to the alternating current side of the rectifier is transmitted by means of a current which lags somewhat behind the E. M. F., sparking is apt to occur at the brushes unless the brushes are adjusted relatively to the commutator so as to vary the point of commutation. It is the prime object of my invention to improve the commutation where the current supplied to the alternating current side of the rectifier has a variable power factor. This variation in power factor may occur for various reasons. For instance, as will be later described, if the segments of the commutator be connected to the secondary winding of a phase multiplying transformer, the variation in load on the transformer produces a power factor variable within quite large limits. Thus a variation in load on the direct current side would cause a variation in the power factor of the alternating current transformer. No matter from what cause this power factor may vary however, my invention is adapted to correct the bad effects of this variation on the commutation. I attain the objects of my invention in an entirely automatic manner so that the point in the period at which commutation occurs is automatically controlled or varied in response to a variation in the power factor. This adjustment in the period at which commutation occurs reduces the current commutated to a minimum.

Other objects and advantages of my invention may become apparent as the description proceeds.

For a better understanding of my invention reference is to be had to the accompanying drawings in which Fig. 1 is a wiring diagram showing one modification of my invention; Fig. 2 illustrates another modification of my invention, and Fig. 3 a further modification.

Referring now more in detail to the drawings, I show in Fig. 1 a source of alternating current 11 to which is adapted to be connected the primary windings 12 of a phase multiplying transformer 13. In the present instance I have shown a three-phase source of supply. The secondary 14 of the phase multiplying transformer 13 in this instance is shown as one having a twelve-phase winding which is connected by means of leads 15 to the segments of a commutator 16 upon which the direct current brushes 17 and 18 bear.

These direct current brushes are connected to the direct current mains 19 and 20. In order that as many secondary phases may be employed as are needed to reduce the voltage per segment and the reactance voltage of commutation I have shown the phase multiplying transformer 13 as mounted upon the same shaft 21 as the commutator 16. In this way but three slip rings 22 are needed to supply the transformer 13 with alternating current power and the transformer may be made to give as many phases as required without the necessity of employing any more slip rings. In the present instance the brushes 17 and 18 are held stationary while the commutator 16 is rotatable. The transformer 13 serves to supply periodically varying potentials to the segments of the commutator 16.

To drive the shaft 21 at synchronous speed so that direct current may be connected at the brushes 17 and 18 in a well understood manner, I utilize for example a synchronous motor 23 which may be conveniently supplied from the alternating current mains 11. The rotatable member of the synchronous motor 23 in this instance is the field member 24 which carries a plurality of field exciting windings 25, 26, 27 and 28 adapted to be supplied with direct current, and arranged in this instance, to produce a bi-polar field.

As thus far described, it is evident that upon energization of the motor 23 and its field 24 the shaft will be rotated at synchronous speed and if then the transformer primary 12 be energized from the mains 11, then direct current may be collected by means of the brushes 17 and 18. A minimum amount of sparking would be obtained at the brushes for a certain relative position of the brushes 17 and 18 with respect to a stationary axis of the apparatus. Upon a variation in power factor, however, it is necessary to shift these brushes to produce the best commutation. In order to effect this result in accordance with the commutation conditions I so energize the field windings 25, 26, 27 and 28 that the axis of this field is shifted either forward or backward, due to the magnetizing effects of these windings. I accomplish this result, for example, in the bi-polar motor which I have shown by locating the windings 25 and 26 on a different axis from that of windings 27 and 28. Should the amount of excitation in all four coils 25, 26, 27 and 28 be equal, then the result of magnetization produced thereby would be in a vertical direction when the rotating field member 24 is vertical. Of course windings 25 and 27 are wound in the same direction, as well as windings 26 and 28. However, if say, the two coils 25 and 26 be provided with an increased excitation, then the resultant axis of magnetization would be shifted slightly toward the left of its former position. A reverse effect is obtained should the coils 27 and 28 be provided with an increased excitation.

I provide means for varying the excitation of these windings in response to commutation conditions, including a double arm rheostat 29 having a rotatable member 30 and two stationary resistances 31 and 32, the resistance 31 being inserted in series with the windings 27 and 28, while resistance 32 is included in series with the windings 25 and 26. The completed circuit for windings 25 and 26 would be as follows: from main 20 of the direct current circuit, through lead 33, collector 34, lead 35, windings 26 and 25, collector 36, lead 37, resistance 32, arm 30, leads 38 and 39 to the other main 19. The completed circuit for the windings 27 and 28 would be as follows: from main 20, through lead 33, collector 34, lead 40, windings 28 and 27, collector 41, lead 42, resistance 31, arm 30, leads 38 and 39 to the main 19. It is evident that upon rotation of the arm 30, say in the counterclockwise direction, the resistance 32 in series with windings 25 and 26 is reduced, while the resistance 31 in series with the other two windings 27 and 28 is increased. This has the effect of varying the relative excitations of these two sets of windings and therefore, as pointed out heretofore, the resultant axis of magnetization produced by these two sets of windings is shifted either to the right or to the left. This in turn has the effect of varying the point in the period in which the commutation occurs in the phases of the secondary 14 of the phase multiplying transformer 13.

I employ an appropriate means for moving the rheostat arm 30 in response to commutation conditions. In the present instance I utilize a pair of auxiliary brushes 43 and 44 which measure the voltage difference between the heel and toe of the main brush 18. This voltage difference is a measure of the commutation conditions and is made use of if it is sufficiently great to operate contacts by means of which a small pilot motor 45 may be operated either in one direction or the other so as to rotate arm 30. The operation of the contacts is effected by means of a polarized relay 46. The voltage difference between the heel and toe of the brushes is used to energize the stationary winding 47 of the polarized relay, while the rotatable winding 48 is connected across the mains 19 and 20 by means of leads 49 and 50. The rotatable coil 48 carries a contact arm 51 which is adapted to be free of either of the stationary contacts 52 and 53, while the voltage difference measured by auxiliary brushes 43 and 44 is below the limiting value for good commutation. However, if this value reaches a predetermined amount in any direction the movable coil 48 responds to the energization of coil 47 and rotates either in a clockwise or a counterclockwise direction, depending upon the relative polarities of brushes 43 and 44. The arm 51 is thus rotated and completes the circuit at contact 52 or 53 for the pilot motor 45. Should the contact 52 be completed as indicated in the figure, the circuit for the pilot motor 45 would be completed as follows: from main 19, lead 39, armature of the pilot motor 45, left-hand section 54 of the field winding, contacts 52 and 51, lead 55, back to main 20. As indicated by the arrows on the field sections 54 and 56 they are wound in opposite directions so that in case the contact arm 51 contacts with the stationary contact 53 the direction of rotation of the small pilot motor 45 is reversed since now the right-hand section 56 of the field winding is energized. In other respects the circuits for the two conditions are identical.

As thus far described, it is evident that upon an increase in commutation voltage as measured by the auxiliary brushes 43 and 44 the pilot motor 45 is arranged to correct this condition by a proper movement of the rheostat arm 30 with respect to the resistances 31 and 32. This has the effect as stated hereinbefore of shifting the point in the period when the commutation occurs and this point is shifted until good commutation is again obtained.

Fig. 2 shows a modification which operates, however, substantially in the same manner as Fig. 1. The sole difference resides in the particular arrangement of the field windings on the synchronous driving motor. In this case the synchronous driving motor 57 has a rotating field member which is wound in a manner analogous to that of a phase wound rotor of an induction motor. That is to say, there are in this instance three field windings, 58, 59 and 60, displaced from each other by equal angles as shown and connected together at one point 61. The collector 34 connects to the direct current main 20 as in the first modification, while the collectors 36 and 41 are connected respectively to exciting windings 58 and 59. These collectors in turn are connected by leads 37 and 42 to their resistances 32 and 31 respectively. It is evident that upon the operation of the pilot motor 45 in the manner explained with respect to the modification shown in Fig. 1, there is a variation in the relative excitations of windings 58 and 59 and therefore there is produced a shift either to the right or left of the axis of magnetization as regards the axis of the shaft 21. This modification has the advantage that no special form of rotor is necessary, as is the case in Fig. 1 and furthermore the split pole effect obtained in Fig. 1 is eliminated by means of the distributed windings.

The shifting of the axis of magnetization should in some cases be rapid to correct the commutation within a reasonable time. The modification shown in Figs. 1 and 2 are adapted to perform this correction at a comparatively slow rate and while this may be perfectly acceptable for some installations, it may not be sufficiently rapid for others. The modification in Fig. 3 is adapted to produce a rapid movement of the axis of magnetization and thus to vary the point at which commutation occurs.

I obtain this result by use of a vibratory relay energized intermittently to short-circuit resistances in the field circuits of the synchronous motor. In Fig. 3 the synchronous motor 57 has field excitation windings 58, 59 and 60 similar to the modification shown in Fig. 2. The collectors 36 and 41 connect to windings 58 and 59 as shown and also to the resistances 66 and 67 which are thus placed in series with the windings 58 and 59. These resistances 66 and 67 are adapted to be intermittently short-circuited in response to the commutation conditions as indicated by the difference in voltage between the heel and toe of the main brushes 17 and 18 and as measured by the auxiliary brushes 43 and 44. In the present instance, however, this voltage difference is made use of (as a preliminary step) to influence an electromagnet structure 68 which comprises a pivoted lever 69 which has a tendency to rotate in opposite directions in response to the excitation of windings 70 and 71 cooperating with cores fastened to the pivoted lever 69. Of course should the capacity of the motor 57 be low enough, relay 68 can be arranged to short-circuit the resistances directly. The difference in voltage between the heel and toe of brush 18 serves as one source of excitation of the windings 70 and 71, which however are also connected so that they receive their main excitation from the direct current mains. Thus the circuit of the auxiliary brushes may be traced as follows: brush 43, lead 72, winding 70, winding 71, lead 73, back to the auxiliary brush 44. In order to strengthen this excitation but at the same time to leave the variation in this voltage difference unchanged as regards its effect upon the pivoted lever 69 a polarizing current is permitted to flow from the main 20, through lead 74, then through both coils 70 and 71 in parallel back to brushes 43 and 44, through the commutator segments with which these brushes engage, to the other main 19.

The variation in the voltage difference between the heel and toe of the brush 18 will cause a variation in the position of the pivoted lever 69 which carries the movable contact blade 75. This in turn causes an engagement and disengagement of this movable contact 75 with the stationary contact pieces 76 and 77. The completion of the contact between contacts 75 and 76 or between contacts 75 and 77 causes one or the other of the electromagnets 78 or 79 to be energized which in turn operates to short-circuit either resistances 66 or 67. The circuit for electromagnet 78 is completed when movable contact 75 engages the stationary contact 76, from main 19 of the direct current mains through leads 80 and 81, contact 75, contact 76, electromagnet 78, lead 82, to main 20. When contacts 75 and 77 are in engagement the circuit for electromagnet 79 is completed as follows: from main 19, through leads 80 and 81, contact 75, contact 77, electromagnet 79, lead 82, back to main 20. While the electromagnet 78 is deenergized, the movable contact 83 is disengaged from the stationary contact 84. In the same manner, while the electromagnet 79 is deenergized, the movable contact 85 is out of engagement with stationary contact 86. This results from the movement of the pivoted levers 87 in response to the energization of magnets 78 and 79. It is these contacts 83, 84 and 85, 86 which actually serve to control the short-circuits of the resistances 66 and 67. The circuit for the field excitation coil 58, for example, may be traced through resistance 66, then through lead 88, to the main 19 of the direct current side, while the other terminal of the coil 58 connects to the neutral point 61 which allows the current to flow through the winding 60, through collector 34, to the other main 20. In the same way the circuit for the exciting winding 59 is completed through collector 41 and resistance 67, through lead 88, to the main 19. These resistances 66 and 67 are made adjustable so that the effects of these exciting windings may be properly varied. Upon the engagement of contacts 83 and 84, for example, due to the movement of the pivoted lever in a counter-clockwise direction 67 is short-circuited and there would now be a path from the exciting winding 59 through collector 41, lead 89, stationary contact 84, movable contact 83, lead 90, lead 92, lead 81, to the main 19. In the same way when the movable contact 85 engages the stationary contact 86 the circuit for the field winding 58 is completed through the collector 36, lead 91, stationary contact 86, movable contact 85, leads 92, 81 and 80, back to main 19. It is to be understood that the movement of the movable contacts 83 and 85 is vibratory in character so that the effective values of the magnetizations produced by the exciting windings of the synchronous motor 57 is dependent upon the period of dwell of the contacts. This in turn is dependent upon the oscillation or movement of the pivoted lever 69 produced by the variation in the commutation condition. The resultant effect is the same as that described with reference to Figs. 1 and 2 except that the regulation is much more rapid and resembles to a great extent the action of the so-called Tirrill regulator.

It may sometimes be of benefit to perform the regulation of the excitation of the field windings in response to the current supplied by the rectifier as well as in response to the voltage between the heel and toe of the main brush. In the present instance this may conveniently be effected by the use of an auxiliary coil 93 placed upon one of the two cores connected to the pivoted lever 69. This coil 93 is in series relation with the rectifier on the direct current side and therefore carries the current supplied thereby. The effective magnetization of coil 93 may be made to assist or oppose that of coil 71 in order to get the best effects. Thus in case it is considered desirable to shift the point in the period at which the commutation is effected by a greater amount if the load is increased, then coils 71 and 93 should assist, while if the contrary effect is desired, the magnetizations should be opposed. In any case the best condition for commutation may be obtained by actual trial. Ordinarily, however, coil 93 may be omitted, since the variation in load directly affects the power factor of the transformer 13 so that the effect of the variation in load may be taken care of by proper design of the electromagnet 68.

While I have shown several modifications of my invention, it is evident that other well known means may be utilized for producing the effect of shifting the point in the period in which commutation occurs. I do not wish therefore to be limited to these modifications but aim to embrace in the appended claims all modifications falling within the scope of my invention.

What I claim as new and desire to secure by Letters Patent of the United States, is:—

1. In a mechanical rectifier, a commutator having a number of segments, means adapted to cause the segments to be at periodically varying potentials, brushes bearing on said commutator, said brushes and commutator being relatively rotatable, and means for varying the point in the period at which commutation occurs in accordance with the voltage difference between the heel and toe of one of said brushes.

2. In a mechanical rectifier, a commutator having a number of segments, means adapted to cause the segments to be at periodically varying potentials, brushes bearing on said commutator, said brushes and commutator being relatively rotatable, and means for varying the point in the period at which commutation occurs in accordance with the voltage difference between the heel and toe of the brushes and the current supplied by the rectifier.

3. In a mechanical rectifier, a commutator having a number of segments, means adapted to cause the segments to be at periodically varying potentials, brushes bearing on said commutator, a synchronous motor having field windings for rotating the commutator, and means for varying the excitation of said windings in response to the voltage difference between the heel and toe of the brushes.

4. In a mechanical rectifier, a commutator having a number of segments, means adapted to cause the segments to be at periodically varying potentials, brushes bearing on said commutator, a synchronous motor having field windings for rotating the commutator, and means for varying the excitation of said windings in response to the voltage difference between the heel and toe of the brushes, and to the current supplied by the rectifier.

5. In a mechanical rectifier, a commutator having a number of segments, means adapted to cause the segments to be at periodically varying potentials, brushes bearing on said commutator, a synchronous motor having a plurality of field windings for rotating the commutator, the axes of said field windings being of a greater number than the number of pairs of poles in the motor, and means for varying the relative excitations of said windings in response to the difference in voltage between the heel and toe of the brushes.

6. In a mechanical rectifier, a commutator having a number of segments, means adapted to cause the segments to be at periodically varying potentials, brushes bearing on said commutator, a synchronous motor having a plurality of field windings for rotating the commutator, the axes of said field windings being of a greater number than the number of pairs of poles in the motor, and means for varying the relative excitations of said windings in response to the difference in voltage between the heel and toe of the brushes and to the current supplied by the rectifier.

7. In a mechanical rectifier, a commutator having a number of segments, means adapted to cause the segments to be at periodically varying potentials, brushes bearing on said commutator, said brushes and commutator being relatively rotatable, a synchronous motor having direct current field windings to produce this rotation, and means for controlling the point in the period at which commutation occurs comprising an electromagnet for controlling the direct current field of said motor, said electromagnet being responsive to the voltage difference between the heel and toe of the brushes.

8. In a mechanical rectifier, a commutator having a number of segments, means adapted to cause the segments to be at periodically varying potentials, brushes bearing on said commutator, said brushes and commutator being relatively rotatable, a synchronous motor having direct current field windings to produce this rotation, and means for controlling the point in the period at which commutation occurs comprising an electromagnet responsive to the voltage difference between the heel and toe of the brushes, and a resistance varying device operated by said electromagnet for varying the excitation of the direct current field windings.

9. In a mechanical rectifier, a commutator having a number of segments, means adapted to cause the segments to be at periodically varying potentials, brushes bearing on said commutator, said brushes and commutator being relatively rotatable, and means for controlling the point in the period at which commutation occurs comprising an electromagnet and contacts controlled thereby, said electromagnet being responsive to the voltage difference between the heel and toe of the brushes and to the current supplied by the rectifier.

10. In a mechanical rectifier, a commutator having a number of segments, means adapted to cause the segments to be at periodically varying potentials, brushes bearing on said commutator, said brushes and commutator being relatively rotatable, and means for varying the point in the period at which commutation occurs comprising a pivoted lever, a pair of electromagnets arranged to rotate said lever in opposite directions, means for energizing said electromagnets in accordance with the difference in voltage between the heel and toe of the brushes, and contacts operated by said lever.

11. In a mechanical rectifier, a commutator having a number of segments, means adapted to cause the segments to be at periodically varying potentials, brushes bearing on said commutator, said brushes and commutator being relatively rotatable, a synchronous motor having field windings for effecting the relative rotation, and means for varying the excitation of said windings comprising a pivoted lever, a pair of electromagnets arranged to rotate said lever in opposite directions, means for energizing said electromagnets in accordance with the difference in voltage between the heel and toe of the brushes, and contacts operated by said lever.

12. In a mechanical rectifier, a commutator having a number of segments, means adapted to cause the segments to be at periodically varying potentials, brushes bearing on said commutator, a synchronous motor for effecting this rotation having field windings the axes of which are of a greater number than there are pairs of poles, vibratory electromagnets arranged to control the excitation of the field windings, and means controlling the operation of the electromagnets, responsive to commutation conditions and to the current supplied by the rectifier.

13. In a mechanical rectifier, a commutator having a number of segments, means adapted to cause the segments to be at periodically varying potentials, brushes bearing on said commutator, a synchronous motor for effecting this rotation having field windings the axes of which are of a greater number than there are pairs of poles, resistances in series with certain of said field windings, electromagnets for short-circuiting said resistances, and means responsive to commutation conditions for determining the durations of energization of said electromagnets.

14. In a mechanical rectifier, a commutator having a number of segments, means adapted to cause the segments to be at periodically varying potentials, brushes bearing on said commutator, a synchronous motor for effecting this rotation having field windings the axes of which are of a greater number than there are pairs of poles, resistances in series with certain of said field windings, a pivoted lever, a pair of electromagnets energized in accordance with the voltage difference between the heel and toe of the brushes arranged to rotate the lever in opposite directions, contacts operated by said lever, and electromagnets for short-circuiting the resistances operated by said contacts.

In witness whereof, I have hereunto set my hand this 30th day of November, 1920.

JOSEPH L. BURNHAM.